Patented June 27, 1939

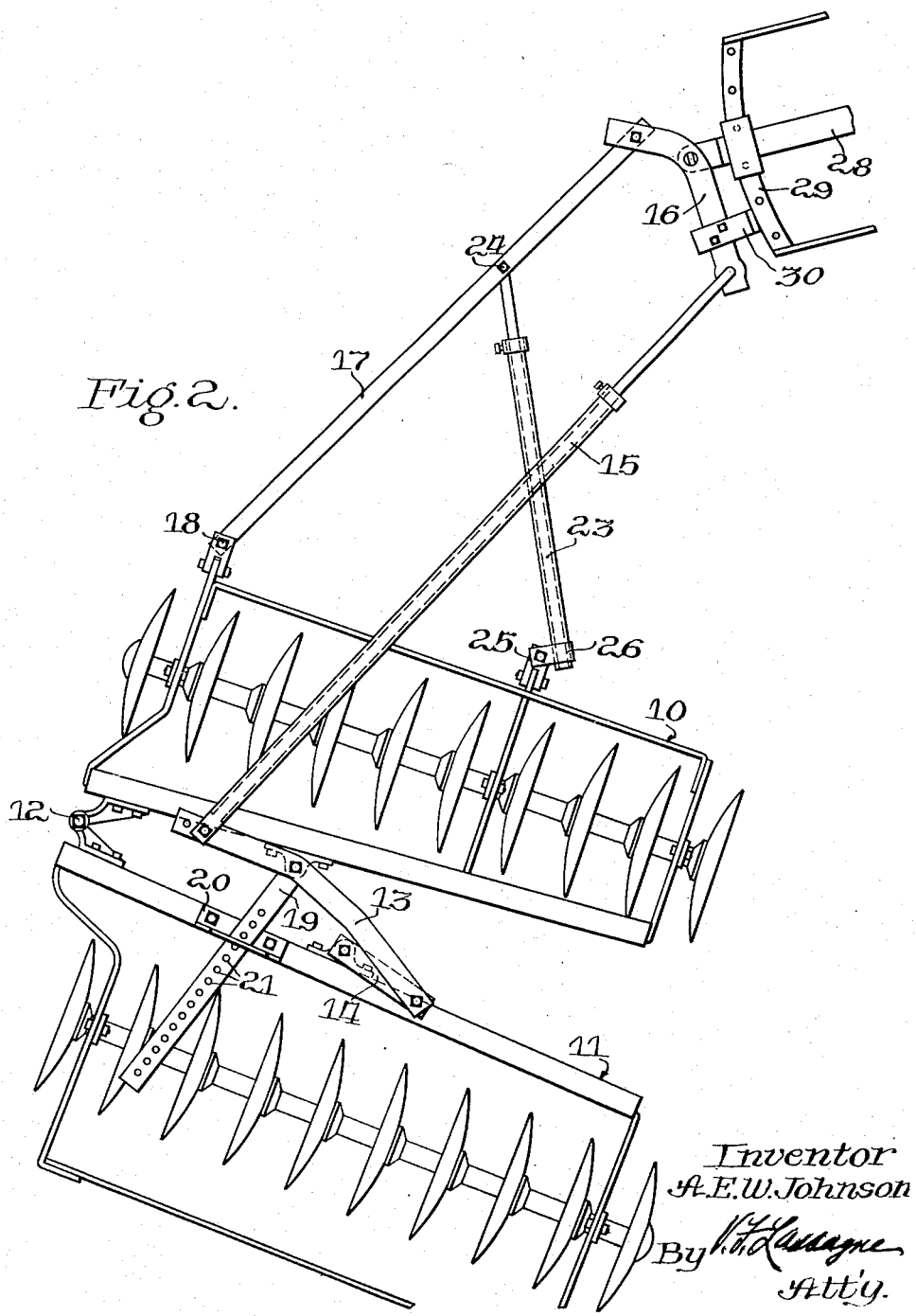

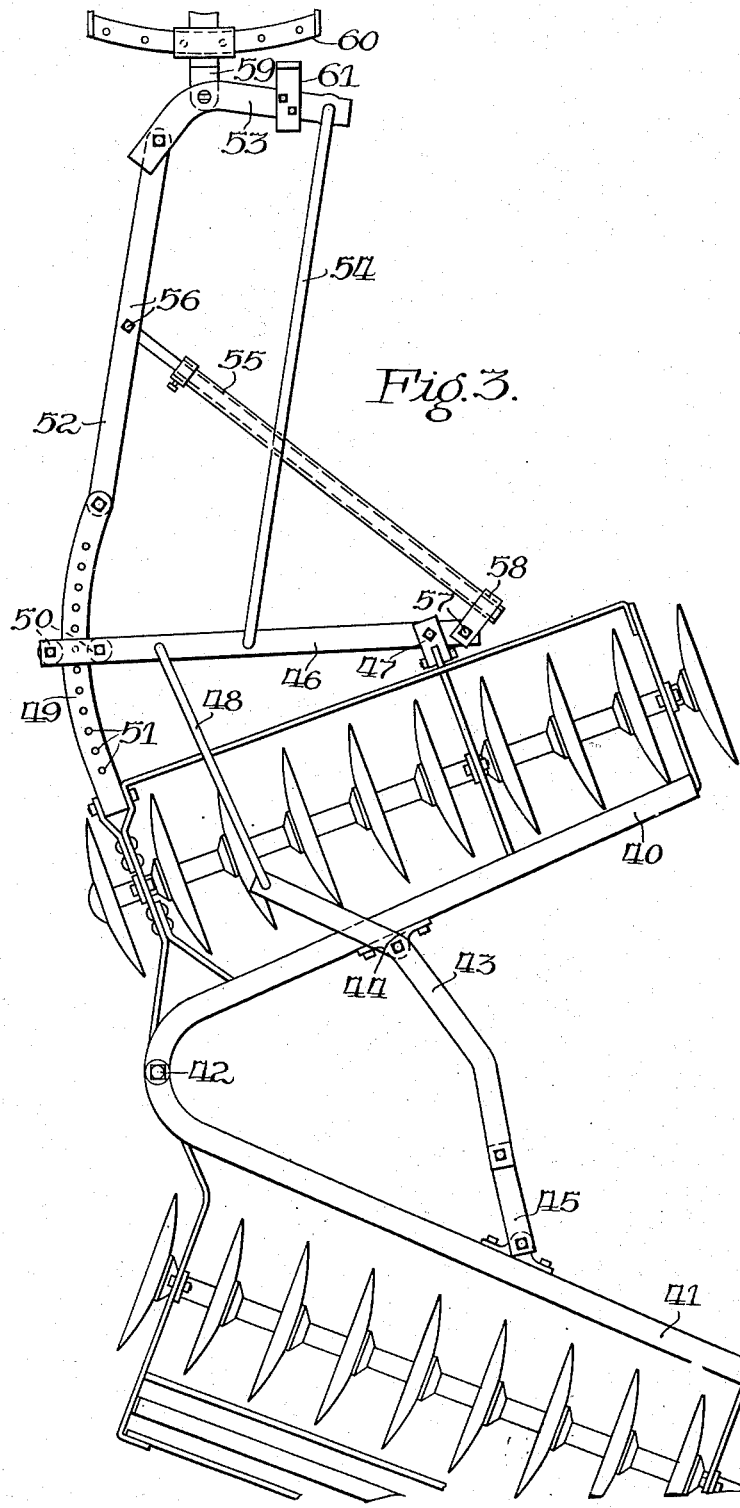

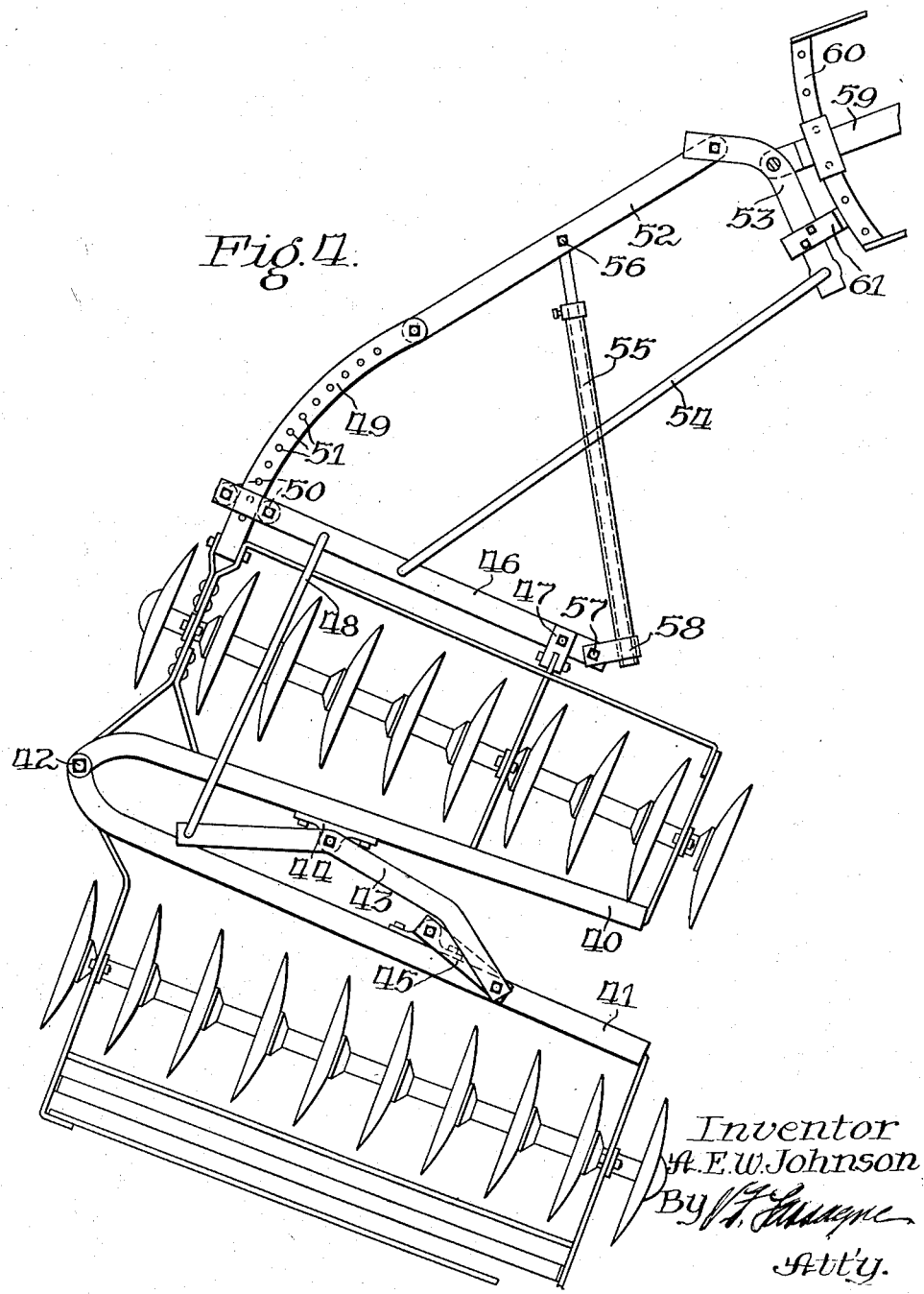

2,164,210

UNITED STATES PATENT OFFICE 2,164,210

HITCH FOR OFFSET HARROWS

Arnold E. W. Johnson, Chicago, Ill., assignor to International Harvester Company, a corporation of New Jersey Application October 15, 1937, Serial No. 169,220

7 Claims. (Cl. 55—83)

This invention relates to off-set harrows and more particularly to a construction which will permit the turning of the harrows.

An object of the invention is to provide an off-set disk harrow construction which may be turned.

Another object of the invention is to provide means which will swing the harrow frames into proper angular relation for turning.

A further object of the invention is the provision of means which will effect the automatic swinging of the harrow frames of the proper relation whenever the tractor or other pulling device is turned.

Disk harrows, of the type to which this invention relates, ordinarily include a pair of sections or frames disposed in tandem relation and offset to one side of the tractor which pulls them. During operation of the harrow, the frames are so positioned that the harrow elements of one frame are at an angle to the elements of the other frame. The frames are in proper relationship for turning the harrow in one direction, but it is necessary to shift the frames to permit the harrow to be turned in the opposite direction.

According to the present invention, the swinging of the harrow frames in the proper angular relation for turning is effected through a transverse bar connected to the forward ends of the draft members and to a draw-bar on a tractor. An abutment member is fastened to the transverse bar and extends toward the tractor. When the harrow is to be turned in the direction where no shifting of the frame is required, it is simply pulled around in that direction. When the harrow is to be turned in the other direction, turning of the tractor causes the frame of the tractor to contact the abutment member and the transverse bar, and a consequent shifting of the transverse bar effects a swinging of the frames into an angular position where they may be turned.

In the drawings:

Figure 2 shows the same harrow construction while a turn to the right is being effected;

Figure 3 is a plan view of a modified form of a harrow construction; and,

Figure 4 shows this harrow construction when a turn to the right is being made.

Figure 1:
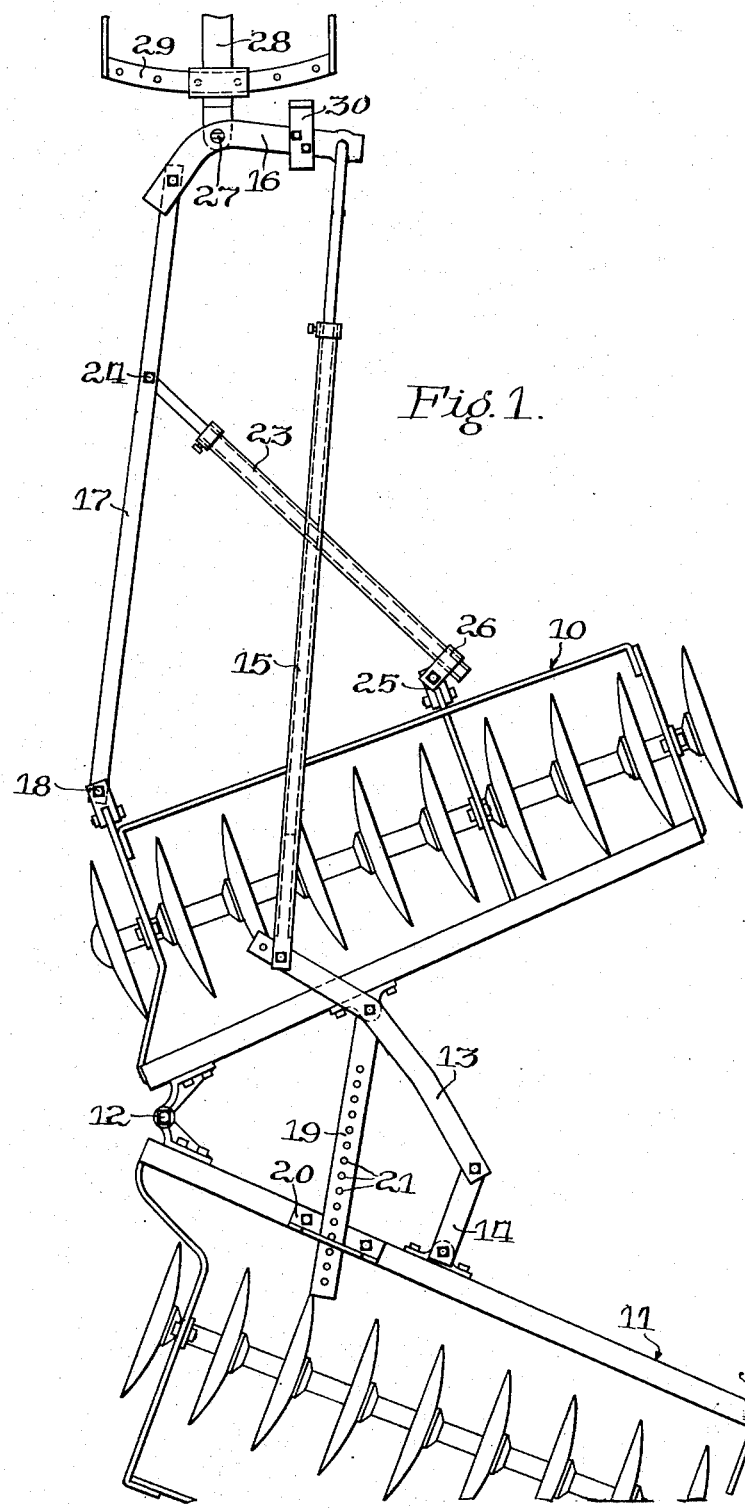
Figure 1 is a plan view showing an improved harrow construction in ordinary operating position.

As shown in Figure 1, there are a front gang frame 10 and a rear gang frame 11 pivotally connected together at 12. Each frame has the usual shaft and harrow elements attached thereto. A lever 13 is pivotally attached intermediate its ends to the rear of the forward frame. A link 14 connects one end of the lever 13 and the rear frame. A telescopic draft member 15 is attached to the other end of the lever and extends forwardly to pivotal connection adjacent one end of a transverse bar 16. Another draft member 17 is attached near the other end of the transverse bar and to the forward side of the forward frame, as at 18. A bar 19 is pivotally attached to the forward frame at the pivot point of the lever 13 and extends through a slotted bracket 20 attached to the rear frame. The angular position of the frames may be changed or may be fixed by means of a pin, not shown, extending through any one of the plurality of openings 21 in the bar 19 and abutting the rear of the bracket 20 to limit the angle between the frames. A telescopic member 23 is pivotally attached at 24 to the draft member 17 and at 25 to the front end of the forward frame 10 through a bracket 26. Pulling means for the harrow, which may be a tractor, is attached to the transverse bar 16 at 27 and, as shown, consists of a draw-bar 28 rigidly attached to a frame 29. An abutment member 30 is fixed to the transverse bar near the point of attachment of the draft member 15.

As seen in Figure 1, the gang frames are in operating position and occupy a proper angular relation for a turn to the left, since the harrow elements are tangent to an imaginary circle having its center to the left of the frames. When a turn to the right is to be made, the frames must be shifted relatively to one another; this is shown in Figure 2. As the tractor is turned to the right, the frame member 29 contacts the abutment member 30. Thus, pressure is exerted on the draft member 15, and the arm of the lever 13 to which the draft member 15 is attached swings rearwardly with respect to the frame 10. The other arm of the lever swings forward, and the frames are moved into the positions shown in Figure 2 wherein the harrow elements are substantially parallel to one another. Thus, the frames are in proper angular position to be turned to the right.

It will be noted that there is no abutment member on the transverse bar 16 adjacent the point of attachment of the draft member, and that the transverse bar is bent back away from the frame member 29. Thus, when the tractor is turned to the left, the frame member 29 does not contact the transverse bar 16 and the angular position of the frames is maintained.

In order that the harrow may be put in transport position, the tractor or pulling means is caused to back up against the frames. The pressure exerted by the draw-bar 28 acts through the transverse bar 16 and draft member 15 to swing the lever 13 about its pivot point on the front frame 10 and to bring the rear frame 11 toward the front frame so that the frames are approximately parallel, as shown in the turning position of Figure 2. Then a pin is inserted through the proper hole 21 in the bar 19 to hold the frames in this position and the frames are in transport position.

The member 23 is formed of telescopic sections so that it may be adjusted in length and the angular position of the draft member 17 be varied with respect to the forward frame 10. During any one operation of the harrow, however, the draft member 17 has the same angle with respect to the frame 10. The other draft member 15 is also made adjustable through telescoping sections, but its length is fixed for any one operation.

Figure 3 shows a modified form of harrow in operating position. It comprises a forward frame 40 and a rear frame 41 pivotally connected at 42. There is a lever 43 pivotally attached to the forward frame 40 at 44, and a link 45 connecting one end of the lever and the rear frame 41. A lever 46 is pivotally attached to the front of the frame 40 by means of a bracket 47. A link 48 connects the lever 46 and the lever 43. The free end of the lever 46 extends across an arcuate member 49, attached to the front side of the frame 40 and forms on an arc having its center at the pivot point of the lever 46 on the frame 40. Circular members 50 are attached to the under-side of the lever 46 and embrace the arcuate member 49. There is a series of holes 51 in the arcuate member, and the angle between the lever 46 and the front frame may be limited by means of a pin through any one of the holes and abutting the front side of the lever 46. Limiting of the angle of the lever 46 in turn limits the angular positions of the disk frames through the links 45 and 48 and the lever 43. A draft member 52 is pivotally connected to the front end of the arcuate member and also to a transverse bar 53. A second draft member 54 is pivotally attached at one end to the transverse bar 53 and at the other end to the lever 46. A telescopic member 55 is attached to the draft member 52 at one end at 56 and at the other end to the lever 46 at a point 57 adjacent the point 47 by means of a bracket 58. A means for pulling the harrow is attached to the transverse bar 53. This may comprise a tractor, or, as shown in the drawings, a draw-bar 59 and a rigidly attached frame member 60. An abutment 61 is attached to the transverse bar 53 on the side extending toward the frame member 60 and adjacent to the draft member 54.

The operation of the harrow shown in Figures 3 and 4 is the same as that of Figures 1 and 2. A turning to the right causes the frame member 60 to contact the abutment member 61. The draft member 54 moves back relative to the front frame 40 and, consequently, the lever 46, the link 48, and the arm of the lever 43, to which the link 38 is attached, also moves back. The other arm of the lever 43 moves forward with respect to the front frame 40, and the rear frame is also brought forward so that the frames occupy the position as shown in Figure 4. In this position, the harrow elements are substantially parallel and turning to the right is made possible.

The member 55 is made in telescopic sections so that it may be adjusted in length and the angular position of the draft member 52 with respect to the front frame 40 may be varied. For any one operation of the harrow, the angular position of the draft member 52 is fixed.

In order to transport the second form of harrow, the pulling means is backed toward the frames. Thus pressure from the draw-bar acts through the draft-bar, lever 46 and link 48 to swing the lever 43 about its pivot point on the front frame and to bring the rear frame toward the front frame so that the frames are approximately parallel as in the turning position of Figure 4. Then a pin is dropped through a hole in the arcuate member 49 at the forward side of the lever 46, and the frames are locked in proper relation for transporting.

From the foregoing description, it will be evident that the harrows are alike, except in several details. In the second form of harrow, the draft member 54 is connected to the lever 43, to the lever 46 and link 48, while in the first form of harrow, the corresponding draft member, which is the member 15, is directly connected to the corresponding lever 13. In the first form of harrow, limiting of the angular position of the frames is effected by means of the bar 19, while in the second form of harrow, this limiting is effected by means of the arcuate member 49 and the levers 43 and 46 and the links 45 and 48.

In both forms of harrows shown, the off-setting is to the right and turning to the right necessitates shifting of the frames. It is understood, however, that the principles of construction shown may also be applied to harrows where the off-setting is to the left and a turn to the left requires shifting of the frames.

It is intended to limit the invention only in terms of the appended claims.

What is claimed is:

1. In combination, a pair of disk gang frames disposed in tandem relation and pivotally connected to one another, a pair of draft members operatively connected to said disk gang frames, a transverse bar pivotally connected to said draft members at spaced points, and a pulling means comprising a frame member pivoted in spaced relation to the transverse bar at a point intermediate the points of attachment of the draft bars so as to contact the transverse bar upon pivoting of the means with respect to the bar.

2. In combination, a pair of disk gang frames disposed in tandem relation and pivotally connected to one another, a pair of draft members operatively connected to said disk gang frames, a transverse par pivotally connected to said draft members at spaced points, an abutment member extending from the transverse bar in proximity to one of the draft bars in the opposite direction from said draft bar, and a pulling means pivoted in spaced relation to the transverse bar at a point intermediate the points of attachment of the draft bars so as to contact the abutment member upon pivoting of the means with respect to the bar.

3. In combination, a pair of disk gang frames disposed in tandem relation and pivotally attached to one another, a pair of draft members operatively connected to said gang frames, a transverse bar pivotally connected to said draft members at spaced points and having a projection extending therefrom in proximity to one draft member but in an opposite direction, and a pulling means comprising a frame member and a draw-bar rigidly connected thereto and extending therefrom and pivoted to the transverse member at a point intermediate the points of attachment of the draft members so that the frame member contacts the projection upon pivoting of the pulling means with respect to the transverse bar.

4. In combination, a pair of disk gang frames disposed in tandem relation and pivotally connected to one another for limited relative angular movement, a draft member fixed at one end to one disk gang frame against relative movement with respect thereto, a transverse member pivotally connected to the other end of the draft member, a link pivotally connected to the transverse member at a point spaced from the point of connection of the draft member, a lever pivoted intermediate its ends to the said gang frame and operatively connected toward one end to the said link and toward the other end to the other gang frame at a point spaced from the point about which the frames pivot with respect to one another, and pulling means comprising a frame member and a draw-bar fixed to the frame member and extending therefrom and pivotally connected to the transverse member at a point between the points of connection of the draft member and the link so that the frame member contacts the transverse member upon pivoting of the pulling means with respect to the transverse member.

5. In combination, a pair of disk gang frames disposed in tandem relation and pivotally connected to one another, a first lever member pivoted intermediate its ends on one frame, a link attached to one end of the lever and the other frame, a second lever pivoted near one end on the first frame, a second link connecting the other end of the first lever and the second lever, an arcuate member attached to the first frame and receiving the free end of the second lever, a first draw member pivotally attached to the arcuate member, a member connected to the first draw-bar and the second lever adjacent its pivot point on the first frame, a second draw member pivoted on the second lever, a transverse bar pivotally connected at spaced points to the draft-bars, and a pulling means comprising a frame member and a draw-bar rigidly attached to the frame member and extending therefrom and pivotally connected to the transverse member at a point intermediate the points of attachment of the draft members so that the frame member contacts the transverse bar upon pivoting of the pulling means with respect to the transverse bar.

6. In combination, a pair of disk gangs movably attached to one another, draft means connected to both gangs and including a transverse member adapted by turning to bring the gangs into proper angled position for turning, and a pulling means comprising a frame member pivoted in spaced relation to the transverse member so as to contact the transverse member upon pivoting of the means with respect to the transverse member and to cause the transverse member to turn with the frame member.

7. In combination, a pair of disk gangs movably connected to one another, draft means connected to the gangs so as by turning to bring the gangs into proper angled position for turning, pulling means pivotally attached to the draft means so as to contact the draft means upon pivoting of the pulling means with respect to the draft means and to cause the draft means to turn with the pulling means.

ARNOLD E. W. JOHNSON.